(12) United States Patent
Liu et al.

(10) Patent No.: US 9,130,726 B2
(45) Date of Patent: Sep. 8, 2015

(54) METHOD AND APPARATUS FOR MITIGATING CONTROL CHANNEL ERROR

(75) Inventors: Zhengwei Liu, San Diego, CA (US); Arnaud Meylan, Juziers (FR); Jun Wang, La Jolla, CA (US); Xiaoxia Zhang, San Diego, CA (US); Kuo-Chun Lee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 914 days.

(21) Appl. No.: 13/289,594

(22) Filed: Nov. 4, 2011

(65) Prior Publication Data

US 2013/0114492 A1    May 9, 2013

(51) Int. Cl.
*H04W 4/00* (2009.01)
*H04L 1/00* (2006.01)
*H04W 72/00* (2009.01)
*H04W 4/06* (2009.01)

(52) U.S. Cl.
CPC ........... *H04L 1/0061* (2013.01); *H04W 72/005* (2013.01); *H04L 2001/0093* (2013.01); *H04W 4/06* (2013.01)

(58) Field of Classification Search
USPC .................................................. 370/312, 329
See application file for complete search history.

(56) References Cited

U.S. PATENT DOCUMENTS

| 8,780,782 | B2 * | 7/2014 | Amerga et al. | 370/312 |
| 2004/0117860 | A1 * | 6/2004 | Yi et al. | 725/147 |
| 2007/0076641 | A1 * | 4/2007 | Bachl et al. | 370/310 |
| 2008/0209301 | A1 * | 8/2008 | Chang et al. | 714/749 |
| 2008/0212509 | A1 * | 9/2008 | Kim et al. | 370/312 |
| 2009/0196363 | A1 * | 8/2009 | Suda et al. | 375/260 |
| 2010/0278176 | A1 * | 11/2010 | Faniuolo et al. | 370/389 |
| 2010/0304774 | A1 | 12/2010 | Lee et al. | |
| 2011/0038296 | A1 | 2/2011 | Yi et al. | |
| 2011/0080859 | A1 | 4/2011 | Phan et al. | |

(Continued)

FOREIGN PATENT DOCUMENTS

EP          2257090 A1     12/2010
JP       2009-535862 A     10/2009

(Continued)

OTHER PUBLICATIONS

Huawei: "Report of email discussion on MBMS user plane details [66b#12]", 3GPP Draft; R2-094435 Report of email discussion on MBMS up 668#12, 3rd Generation Partnership Project (3GPP), Mobile Competence Centre; 650, Route des Lucioles; F-06921 Sophia-Antipolis Cedex; France, vol. RAN WG2, No. Shenzhen, China; 20090824-20090828, Aug. 26, 2009, XP050604676.

(Continued)

*Primary Examiner* — Farah Faroul
(74) *Attorney, Agent, or Firm* — Arent Fox LLP

(57) ABSTRACT

Methods and apparatuses are provided that include decoding multicast broadcast communications where scheduling information related to a multicast channel is not properly received over a control channel. Media access control (MAC) packets can be decoded to determine whether a MAC subheader indicates the packet relates to a logical channel by indicating an associated channel identifier. Where the channel identifier of the MAC packet matches that of a requested logical channel, data in the MAC packet can be provided to a communications layer. Subsequent packets can be processed and provided to the communications layer until a different channel identifier is encountered.

29 Claims, 12 Drawing Sheets

(56) References Cited

U.S. PATENT DOCUMENTS

| | | |
|---|---|---|
| 2011/0080860 A1 | 4/2011 | Hsu |
| 2011/0085488 A1* | 4/2011 | Widegren ..................... 370/312 |
| 2011/0176471 A1 | 7/2011 | Tseng et al. |
| 2011/0243054 A1* | 10/2011 | Yi et al. ........................ 370/312 |
| 2012/0039233 A1* | 2/2012 | Kim et al. ..................... 370/312 |
| 2012/0099509 A1* | 4/2012 | Ai et al. ........................ 370/312 |
| 2012/0300689 A1* | 11/2012 | Lee et al. ...................... 370/312 |
| 2013/0191706 A1* | 7/2013 | Zopf ............................. 714/776 |

FOREIGN PATENT DOCUMENTS

| | | |
|---|---|---|
| KR | 2011-0039186 A | 4/2011 |
| WO | WO-2007/126156 A1 | 11/2007 |
| WO | 2011023254 A1 | 3/2011 |

OTHER PUBLICATIONS

International Search Report and Written Opinion—PCT/US2012/063237—ISA/EPO—Feb. 7, 2013.

ASUSTeK, et al., "Error handling for MBMS PDU", 3GPP R2-101819, Feb. 26, 2010, 4 Pages.

ASUSTeK: "Error handling for MBMS PDU", 3GPP R2-101318, Feb. 26, 2010, 4 Pages.

* cited by examiner

METHOD AND APPARATUS FOR MITIGATING CONTROL CHANNEL ERROR

BACKGROUND

1. Field

The following description relates generally to wireless network communications, and more particularly to decoding control channel communications.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

Evolved multicast broadcast multimedia service (eM-BMS) can also be supported such that base stations or other devices can broadcast multimedia data over a multimedia broadcast over single frequency network (MBSFN) or similar subframes. Devices can receive and consume the data based at least in part on parameters regarding structure and occurrence of the MBSFN subframes. In one specific example, a base station can transmit an MBSFNAreaConfiguration in a configuration message that can specify allocated resources and periods for transmitting channels (e.g., physical multicast channels (PMCH)), corresponding logical channel identifiers for the channels, multicast channel (MCH) scheduling period (MSP) over which a MCH scheduling information (MSI) media access control (MAC) control element is transmitted, etc. For example, the MSI MAC control element can be transmitted by a base station in a first subframe of each scheduling period of PMCH. If the MSI MAC control element is not properly received, however, the device cannot receive the PMCHs, and thus cannot receive eMBMS, until a next MSP can be received (e.g., 10 seconds in some configurations).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with processing multicast broadcast data when scheduling information is not properly received. In one example, media access control (MAC) layer protocol data units (PDU) corresponding to multicast channel instances can be decoded to determine associated channel identifiers in one or more subheaders of the PDUs. If the channel identifier matches that of a requested logical channel or other channel of interest, SDUs corresponding to the PDU can be provided to a communications layer for decoding until a next channel identifier is encountered in a PDU or the last subframe of the multicast channel is detected. In another example, previously stored scheduling information can be used to decode broadcast data.

According to an example, a method for receiving multicast broadcast data in a wireless network is provided that includes receiving multicast broadcast data in one or more signals and determining whether there is an error in receiving scheduling information related to the multicast broadcast data. The method further includes decoding a MAC layer subheader in a MAC layer packet corresponding to at least a portion of the multicast broadcast data when it is determined that the error occurred and determining whether a channel identifier in the MAC layer subheader corresponds to a requested channel identifier of a requested logical channel.

In another aspect, an apparatus for receiving multicast broadcast data in a wireless network is provided. The apparatus includes means for receiving multicast broadcast data in one or more signals and means for determining whether there is an error in receiving scheduling information related to the multicast broadcast data. The apparatus further includes means for decoding a MAC layer subheader in a MAC layer packet corresponding to at least a portion of the multicast broadcast data when it is determined that the error occurred and means for determining whether a channel identifier in the MAC layer subheader corresponds to a requested channel identifier of a requested logical channel.

In yet another aspect, an apparatus for wireless communications is provided that includes at least one processor configured to receive multicast broadcast data in one or more signals and determine whether there is an error in receiving scheduling information related to the multicast broadcast data. The at least one processor can be further configured to decode a MAC layer subheader in a MAC layer packet corresponding to at least a portion of the multicast broadcast data when it is determined that the error occurred and determine whether a channel identifier in the MAC layer subheader corresponds to a requested channel identifier of a requested logical channel. The apparatus also includes a memory coupled to the at least one processor.

Still, in another aspect, a computer-program product for receiving multicast broadcast data in a wireless network is provided including a computer-readable medium having code for causing at least one computer to receive multicast broadcast data in one or more signals and code for causing the at least one computer to determine whether there is an error in receiving scheduling information related to the multicast broadcast data. The computer-readable medium further includes code for causing the at least one computer to decode a MAC layer subheader in a MAC layer packet corresponding to at least a portion of the multicast broadcast data when it is determined that the error occurred and code for causing the at least one computer to determine whether a channel identifier in the MAC layer subheader corresponds to a requested channel identifier of a requested logical channel.

Moreover, in an aspect, an apparatus for receiving multicast broadcast data in a wireless network is provided that includes a receiving component for receiving multicast broadcast data in one or more signals and a scheduling information obtaining component for determining whether there is an error in receiving scheduling information related to the multicast broadcast data. The apparatus further includes a MAC protocol data unit (PDU) decoding component for decoding a MAC layer subheader in a MAC layer packet corresponding to at least a portion of the multicast broadcast data when it is determined that the error occurred and a PDU identifying component for determining whether a channel identifier in the MAC layer subheader corresponds to a requested channel identifier of a requested logical channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
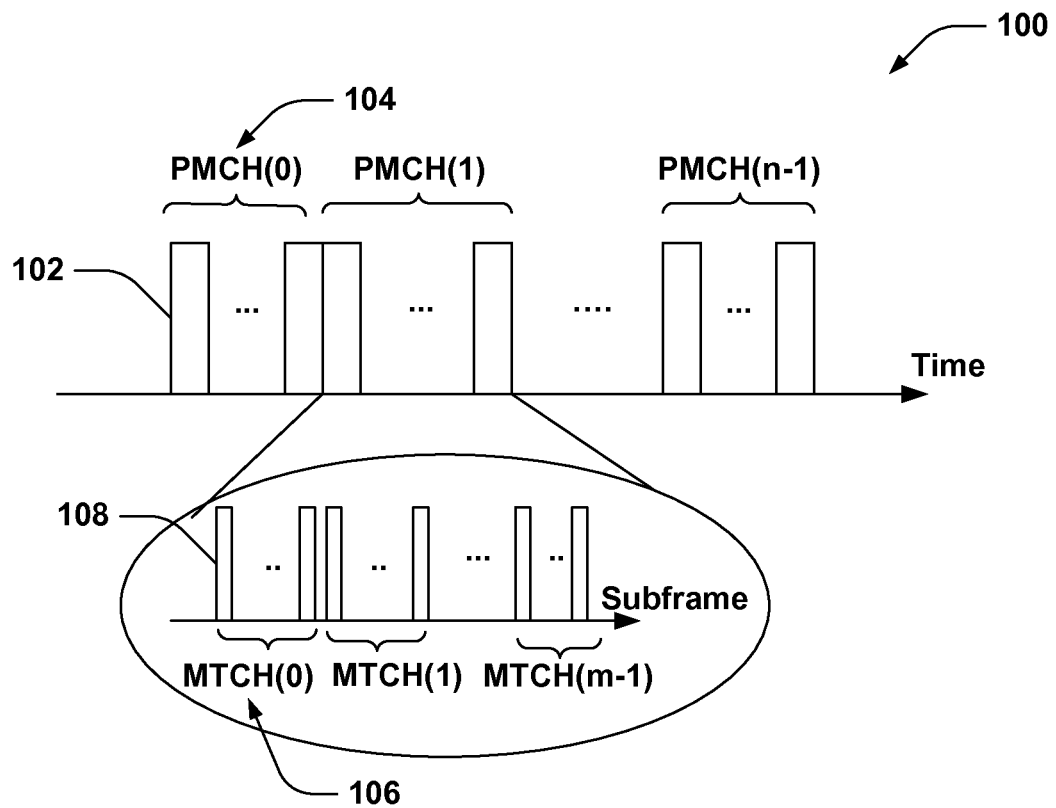
FIG. 1 is a block diagram of an aspect of an example frame configuration for multicast broadcast data.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to decoding multicast broadcast data when corresponding scheduling information is not properly received. In one example, media access control (MAC) layer protocol data units (PDUs) relating to a subframe of a physical multicast channel (PMCH) from a base station can be decoded. A logical channel identifier (LCID) can be present in one or more of the PDUs. Where a LCID matches that of a requested multicast traffic channel (MTCH), a device can provide the PDUs or related service data units (SDU) to a communications layer for decoding until a different LCID is encountered in a subsequent PDU or until a last subframe in a given scheduling period is reached. This can include decoding the LCID in a subsequent instance of the PMCH in a scheduling period. In another example, previously received scheduling information can be utilized to decode the multicast broadcast data. In either case, where a device does not properly receive the scheduling information, it may still be possible for the device to obtain desired multicast broadcast data in the scheduling period.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates an example frame configuration 100 for multicast broadcast communication. For example, multicast broadcast services can be provided over a time division multiplexing (TDM), orthogonal frequency division multiplexing (OFDM) or similar system for wireless communications. For example, frame 100 can include multiple communication subframes, such as subframe 102 over which broadcast data can be communicated. In one example, subframe 102 can include one or more OFDM symbols that additionally include a number of frequency subcarriers that can be assigned to various communications. In this example, frame 100 can be one of a number of frames or subframes reserved for communicating multicast broadcast data.

Frame 100 can include multiple (e.g., n, where n is an integer) physical multicast channels (PMCH) 104 over which broadcast data can be communicated in one or more frames. Each PMCH 104 can include a number of subframes 102. Each PMCH 104 can also include a number (e.g., m, where m is an integer) of logical multicast traffic channels (MTCH) 106 within the subframes 102 of the PMCH. Moreover, for example, a given PMCH can be defined over one or more and/or a portion of a subframe, and the MTCHs 106 can correspond to the one or more and/or a portion of the given subframe. MTCHs 106 can also include a number of OFDM subframes 108, which can be the same as subframes 102 and/or portions thereof.

In a specific example, a base station or other broadcasting entity can schedule PMCHs 104 for carrying certain multicast broadcast data, and can broadcast configuration information. For example, in evolved multicast broadcast multimedia service (eMBMS), a base station can broadcast a multimedia broadcast over single frequency network (MBSFN) configuration (e.g., MBSFNAreaConfiguration) over a multicast control channel (MCCH) that indicates resources allocated for transmitting PMCHs 104 in an MBSFN area, allocation of resources for PMCHs in the area, a temporary mobile group identity and session identifier of the MTCHs 106, a multicast channel (MCH) scheduling period (MSP) over which a MCH scheduling information (MSI) MAC control element can be transmitted. The MSI MAC control element schedules MTCHs 106 and/or can indicate framing information for the MTCHs 106.

Assuming that the MBSFN configuration is received, the PMCH transmissions structure can be obtained as well as the MSP during which each PMCH communicates a corresponding MSI MAC control element that indicates an MTCH 106 structure within the PMCH 104. For example, the MSI MAC control element can include LCIDs along with correspond stop indicators specifying where the MTCH related to the LCID stops in the given PMCH. Where the MSI MAC control element is not received by a device or other entity receiving the broadcast data, however, the device may not be able to correctly decode the MTCHs 106 in a given PMCH 104 to receive requested broadcast data. For example, the requested broadcast data can correspond to one or more requested logical channels (e.g., MTCH), which can be broadcast channels transmitted by a broadcast station that are subscribed to or otherwise requested or indicated as desired at a device (e.g., by the device, by an application or interface operating at the device, and/or the like).

Figure 2:
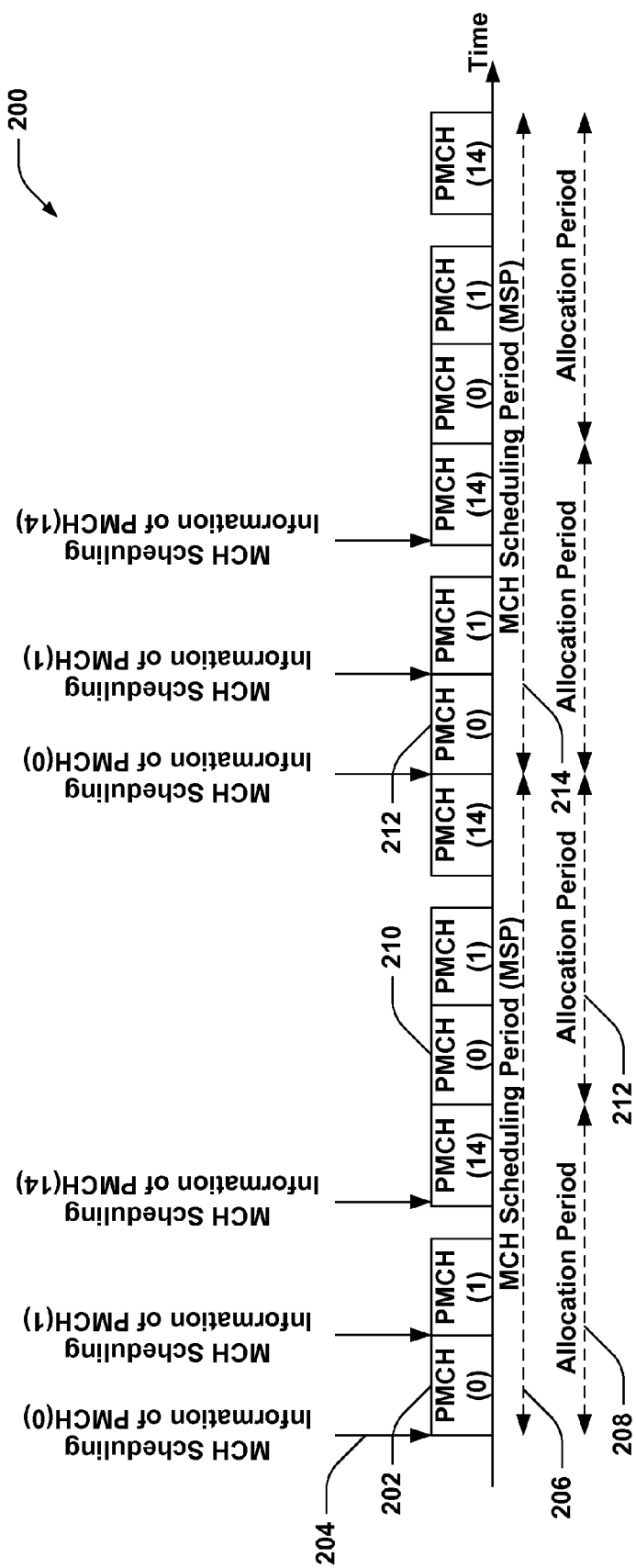
FIG. 2 is a block diagram of an aspect of an example communication timeline for multicast broadcast data.

FIG. 2 illustrates an example communication timeline 200 for communicating multicast broadcast data. Timeline 200 depicts a plurality of PMCHs 202 over a period of time (e.g., in one or more frames). The PMCHs can each comprise MTCHs for eMBMS data, and can correspond to the physical channel over which the MTCHs are transmitted in a given time period. Each PMCH can comprise different data for the given MTCHs. For each PMCH, such as PMCH (0) 202, MSI for the PMCH, such as MSI 204, can be provided at the beginning of the PMCH. Moreover, there can be multiple instances of a given PMCH, such as PMCH (0) 202, in a given MSP 206, and the MSP can include a plurality of allocation periods 208 over which the PMCH instances 202 can be transmitted. For example, PMCH (0) 210 in allocation period 212 can include the same amount of data as PMCH (0) 202 in allocation period 208 by virtue of being in the same MSP 206. MSI 204, however, is provided for the PMCH (0) 202 and not PMCH (0) 210, in this example. Thus, if the MSI 204 is not properly received, the data in PMCH (0) 202 and in PMCH (0) 210 may not be properly decoded based on the MSI. As described, this can cause significant delay in receiving data for a requested MTCH in the PMCH, as a receiving entity needs to wait until the next MSP 214 to obtain the MSI and decode the PMCHs. This can be a 10 second delay in some configurations, for example.

Figure 3:
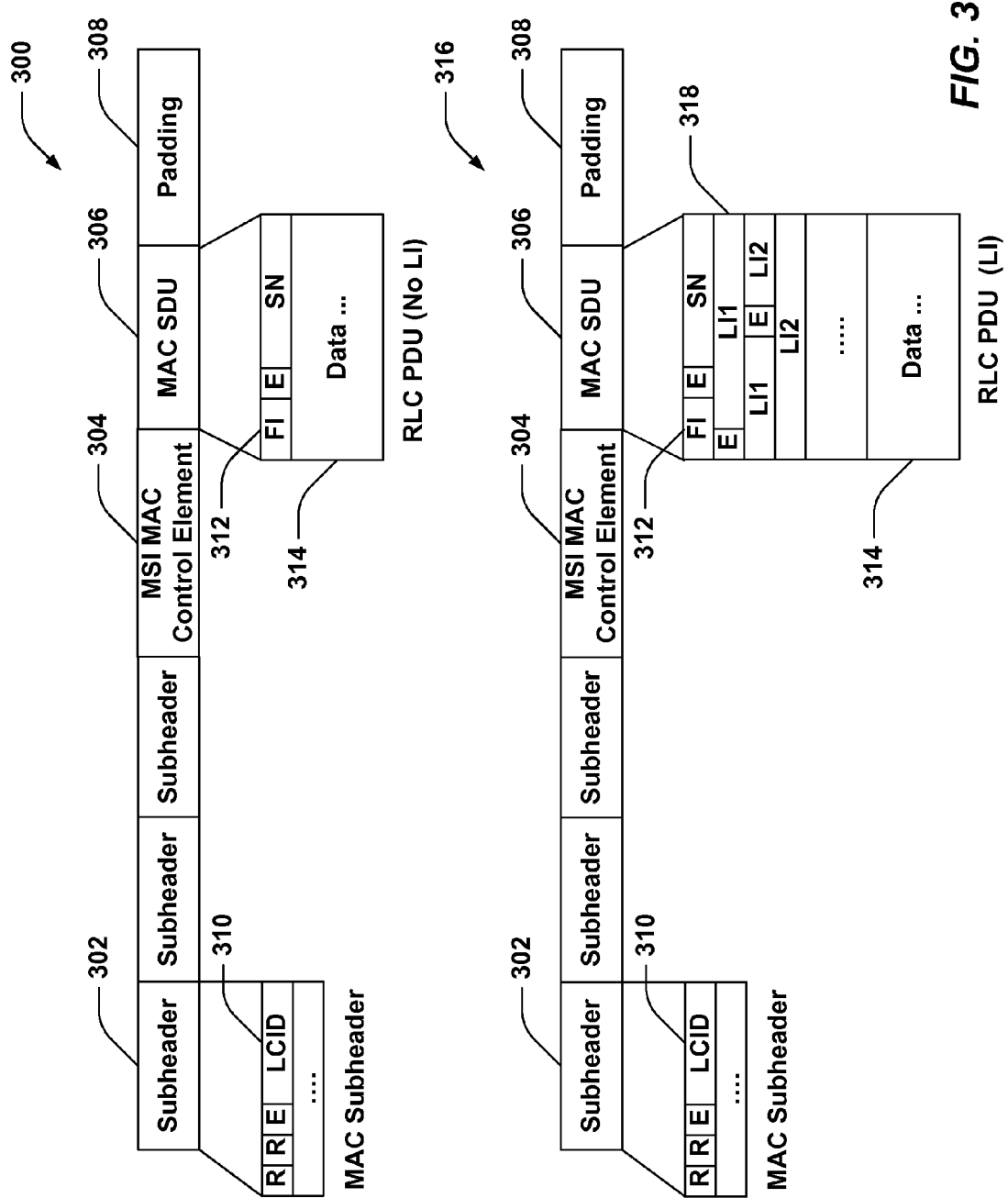
FIG. 3 is a block diagram of an aspect of example protocol data units (PDU) for multicast broadcast data.

FIG. 3 illustrates example MAC PDUs 300 and 316 for communicating multicast broadcast data. MAC PDU 300 can include a plurality of subheaders 302, a MSI MAC control element 304, a MAC SDU 306, and/or padding bits 308. At least one of the subheaders 302 can be a MAC subheader that includes a LCID 310 related to data in the MAC SDU 306. For example, the LCID 310 can indicate the MCCH, MTCH, MSI MAC control element, or other data in the MAC PDU. In a specific example, LCID 310 of 0 can indicate MCCH; 1-28 can indicate MTCHs (or 0-28 where no MCCH is present); 29 can indicate MSI MAC control element 304; 30 can be reserved; and 31 can indicate padding 308.

The MAC SDU 306 can include a radio link control (RLC) layer PDU with no length indicator (LI). MAC SDU 306 can also include framing information 312 along with the data 314 where the framing information 312 can include parameters regarding whether certain bits in data 314 correspond to first or last bits in the RLC PDU. In one example, the framing information can be two bits defined as: 00—first byte of the data 314 field corresponds to the first byte of an RLC SDU, and last byte of the data 314 field corresponds to the last byte of a RLC SDU; 01—first byte of the data 314 field corresponds to the first byte of an RLC SDU, and last byte of the data 314 field does not correspond to the last byte of a RLC SDU; 10—first byte of the data 314 field does not correspond to the first byte of an RLC SDU, and last byte of the data 314 field corresponds to the last byte of a RLC SDU; and 11—first byte of the data 314 field does not correspond to the first byte of an RLC SDU, and last byte of the data 314 field does not correspond to the last byte of a RLC SDU.

In this regard, where MSI MAC control element 304 is not properly received at a device or other entity receiving multicast broadcast data, information regarding the structure of MAC PDU 300, communication timeline 200, and/or frame configuration 100 can be utilized to decode a given MTCH. In one example, an LCID 310 can be obtained from each MAC PDU 300 received over resources configured for multicast broadcast data. If the LCID 310 matches that of requested MTCH, the MAC SDU 306, and/or at least data 314 thereof, can be provided to a higher layer for processing. MAC PDU 316 is similar to MAC PDU 300 other than that the RLC PDU includes LIs 318, e.g., LI1, LI2, . . . . The requested MTCH, as described, can correspond to an MTCH subscribed to by or for a device (e.g., by an application or interface of the device, by a network for the device, and/or the like).

Figure 4:
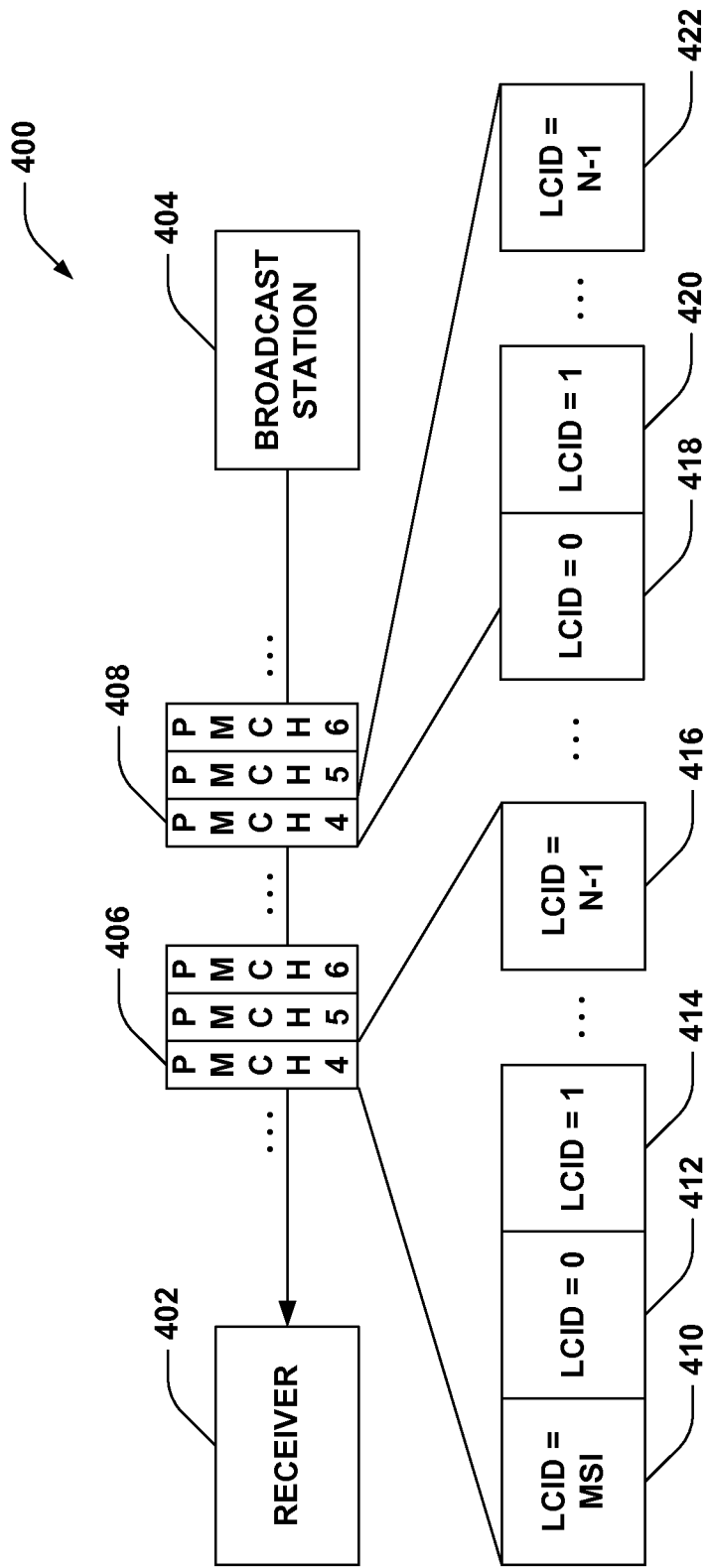
FIG. 4 is a block diagram of an example system for decoding multicast broadcast data.

FIG. 4 depicts an example multicast broadcast system 400 that communicates multicast broadcast data to one or more receivers. System 400 includes a receiver 402, which can be a device or similar entity that receives broadcast data, and a broadcast station 404, which can be a base station, peer-to-peer device, etc., as described. Broadcast station 404 can communicate multicast broadcast data to receiver 402 and/or other receivers over subframes indicated as MBSFN subframes. Such subframes can include subframes 406 and 408 over which PMCHs can be communicated in a MSP. Within a PMCH 406 and/or 408, for example, broadcast station 404 can transmit multiple MAC SDUs 410, 412, 414, 416, 418, 420, and 422 with varying LCIDs for reception by receiver 402.

For example, PMCH 406 can include a first MAC SDU 410 that has an LCID indicating the MAC layer SDU includes an MSI MAC control element. In some instances, the receiver 402 may not receive this MAC SDU 410 or otherwise may receive the MAC SDU 410 with a low signal quality or some other reason that prevents successful decoding of the MAC SDU 410. In this situation, receiver 402 may not be able to obtain the MSI MAC control element that describes the layout of MTCHs within subsequent MAC SDUs 412, 414, 416, and also MAC SDUs 418, 420, and 422 in another instance of PMCH 4 408 within the same MSP. As shown, the MAC SDUs 412, 414, 416, 418, 420, and 422 have LCIDs that correlate to an LCID of an MTCH transmitted by broadcast station 404. For example, the broadcast station 404 can transmit MTCHs with LCIDs 0 to N–1. The receiver 402 can subscribe or otherwise request to receive certain MTCHs. The receiver 402 can determine or otherwise obtain LCIDs related to the requested MTCHs. Receiver 402 can utilize the LCID in the MAC SDUs 412, 414, 416, 418, 420, and 422 to determine whether the MAC SDUs correspond to multicast broadcast data in an MTCH to which the receiver 402 subscribes or otherwise requests.

It is to be appreciated that receiver 402 may miss or otherwise not be able to decode other MAC SDUs as well. In any case, receiver 402 can determine whether an LCID of a given received MAC SDU correlates to that of a requested MTCH; if so, the receiver 402 can process the MAC SDU to attempt to obtain the MTCH data. As further shown in this example, a subsequent PMCH 4 408 in the same MSP as PMCH 4 406 may not have a MAC SDU with a MSI MAC control element. Thus, if the receiver 402 misses MAC SDU 412 with LCID=0 as well and this correlates to the requested MTCH, the receiver 402 can instead obtain and process MAC SDU 418 in the subsequent PMCH 4 408 instance.

In another example, receiver 402 can utilize a previous MSI (e.g., for PMCH 406) received in a previous MSP and can attempt to decode the MAC SDUs corresponding to the requested MTCH(s) based on the previous MSI. For example, this can include determining positioning of the MTCHs within the MAC SDUs based on LCID and stop subframe and/or frame indicators in the previous MSI. For example, receiver 402 can add a timing advance to the MSI to account for the timing difference between the previous instance of the PMCH and PMCHs 406 and/or 408.

Moreover, in another example where receiver 402 does not properly receive (e.g., misses or cannot properly decode or interpret, etc.) the MSI, receiver 402 can compare an LCID of a currently received MAC SDU, such as MAC SDU 414 for example, to an LCID of a requested MTCH. Thus, for example, where a requested MTCH of receiver 402 has a LCID=0, and receiver 402 begins receiving MAC SDU 414 with LCID=1, the receiver 402 can obtain the next PMCH 4 408 instance based on determining that the MAC SDU 412 with LCID=0 has already been missed. Where the requested MTCH of receiver 402 has a LCID=2, receiver 402 can continue receiving until a MAC SDU with LCID=2 is obtained and can provide data within the MAC SDU to an RLC or other communication layer. Where the requested MTCH of receiver 402 has a LCID=1, receiver 402 can interpret framing information of MAC SDU 414 to provide at least partial data within one or more received SDUs to an RLC or other layer. For example, a MTCH can span multiple MAC SDUs, and thus framing information, as described above, can be used to determine which portion of a MAC SDU relates to the MTCH.

In the case that the requested MTCH has a LCID=1, and receiver 402 misses MAC SDU 414 and MAC SDU 420 with LCID=1, the receiver 402 can attempt to receive a next instance of PMCH 4 in a subsequent MSP. In this example, the receiver 402 may receive MSI for the PMCH, and thus can obtain MTCH data in MAC SDUs based on the MSI in the subsequent PMCH instance.

Figure 5:
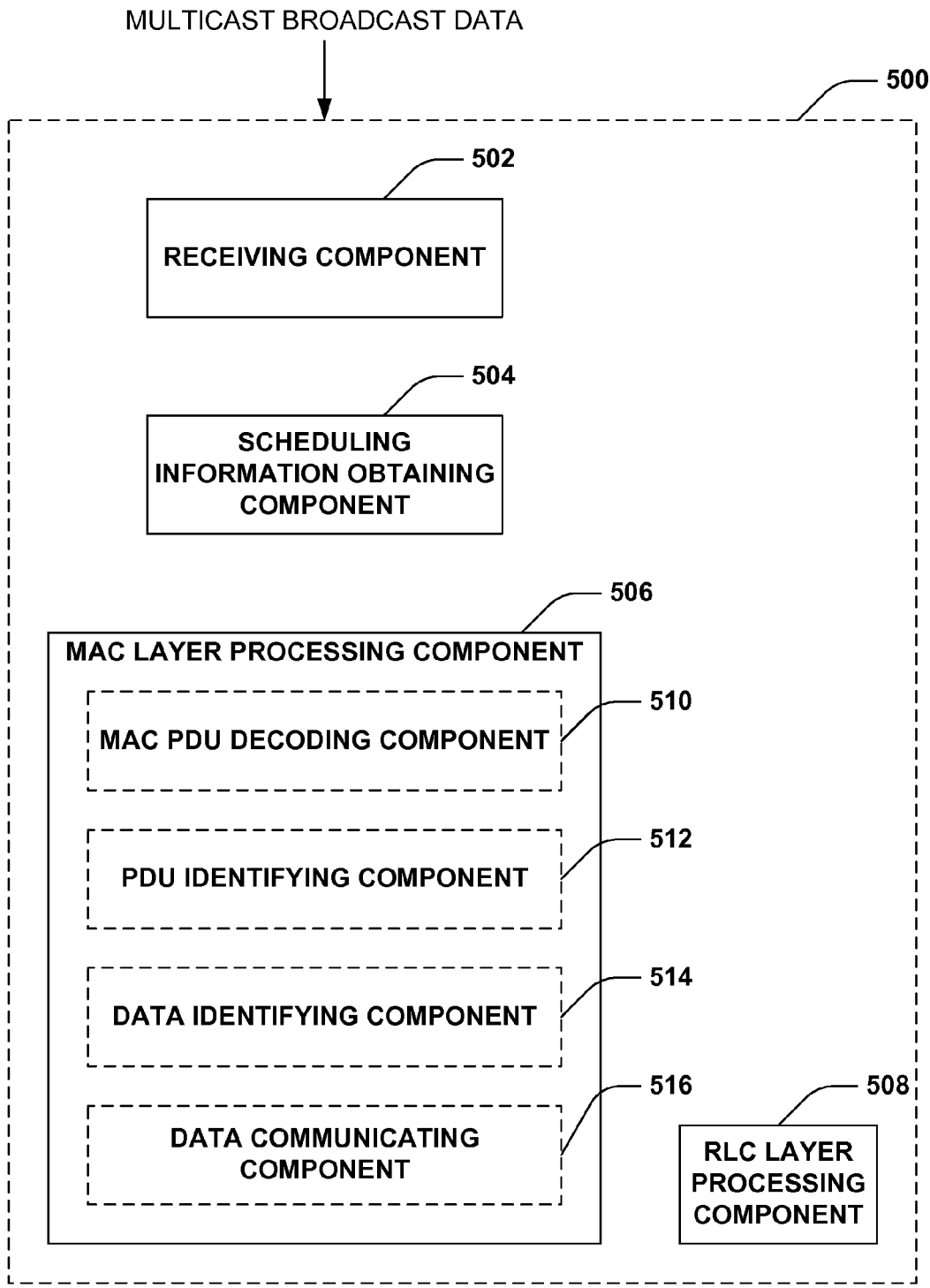
FIG. 5 is a block diagram of an example apparatus for decoding multicast broadcast data.

FIG. 5 illustrates an example apparatus 500 for processing multicast broadcast data received from one or more sources. Apparatus 500 can be a UE, modem (or other tethered device), femto node (or component thereof, such as a network listening module), home Node B or home eNode B (H(e)NB), a pico node, micro node, relay station, mobile base station, macro node, a portion thereof, and/or substantially any node equipped to receive signals in a wireless network.

Apparatus 500 can include a receiving component 502 for receiving multicast broadcast data in one or more signals, a scheduling information obtaining component 504 for decoding an MSI MAC control element from the one or more signals, a MAC layer processing component 506 for processing the one or more signals to obtain MAC layer PDUs for providing to an RLC layer processing component 508. It is to be appreciated that apparatus 500 can include additional components for further processing the signals (e.g., for communications protocol layer, application layer, or similar network layer processing), as well as those to perform other functions of the example possible apparatuses 500; such components are not shown for ease of explanation.

MAC layer processing component 506 can optionally include a MAC PDU decoding component 510 for decoding a MAC PDU in a current subframe, a PDU identifying component 512 for determining identifying information regarding the MAC PDU, a data identifying component 514 for obtaining data communicated in the MAC PDU (e.g., in one or more MAC SDUs), and/or a data communicating component 516 for providing the data to a next communication layer.

According to an example, receiving component 502 can obtain multicast broadcast data from a transmitting entity (e.g., a base station, device, relay, or other point of transmission, not shown). For example, the multicast broadcast data can correspond to eMBMS data received in one or more MBSFN subframes, as described. It is to be appreciated that apparatus 500 can have previously received an MBSFNArea-Configuration in a configuration message from the transmitting entity over an MCCH indicating the MBSFN subframe configuration, PMCH intervals, and/or the like. Apparatus 500 can thus determine whether received data is eMBMS data based on the subframe over which it is received, and/or which PMCH is received in the subframe. In addition, apparatus 500 can identify a requested logical channel corresponding to requested data based on a channel identifier, such as an LCID. Apparatus 500 can have previously received or otherwise identified one or more LCIDs corresponding to requested logical channels (e.g., MTCH) carrying certain multicast broadcast data. For example, an application executing on apparatus 500 can subscribe to eMBMS data. It is to be appreciated that though concepts herein are described in terms of LCID, other channel identifiers can similarly be utilized for determining requested logical channels.

Scheduling information obtaining component 504 can attempt to receive scheduling information from multicast broadcast data, such as an MSI MAC control element or similar information that specifies location of logical channels within physical channels. As described, the MSI MAC control element can be sent for a given PMCH once per MSP and can indicate a stop frame and subframe of each MTCH transmitted in the PMCH. The MSI MAC control element can further include LCIDs of the MTCHs, and thus given the MSI MAC control element, MAC layer processing component 506 can determine one or more frames and/or subframes thereof within a PMCH comprising data related to a requested logical channel (e.g., MTCH) based on the LCID. MAC layer processing component 506 can subsequently obtain data in the identified frames and/or subframes, and provide the data to RLC layer processing component 508.

In some cases, however, scheduling information obtaining component 504 may not properly receive the MSI MAC control element for a given PMCH. For example, scheduling information obtaining component 504 may miss the MSI MAC control element signal, receive the MSI MAC control element in a signal with low signal quality such that the MSI MAC control element cannot be properly decoded, and/or the like. In this regard, for example, scheduling information obtaining component 504 can determine an error with respect to receiving the MSI MAC control element based at in part on at least one of determining that a subframe over which the MSI MAC control element is expected is not received, determining that a signal quality of a signal received in the subframe is below a threshold, determining an error in the decoding process (e.g., failed cyclic redundancy check (CRC)), and/or the like.

In one example, MAC layer processing component 506 can attempt to determine packets at the MAC layer related to a requested logical channel. As described, MAC PDUs in some multicast broadcast configurations can include an LCID associated to the MAC PDU in one or more MAC subheaders. Thus, where scheduling information obtaining component 504 does not properly receive the MSI MAC control element, MAC PDU decoding component 510 can begin decoding received packets at the MAC layer to obtain MAC PDUs in the subframe corresponding to the PMCH for which the MSI MAC control element is not received.

In this example, PDU identifying component 512 can obtain a channel identifier related to a given MAC PDU from an associated MAC subheader. If the channel identifier (e.g., LCID in eMBMS) is that of a requested logical channel (e.g., MTCH in eMBMS), data identifying component 514 can obtain data from the corresponding MAC SDU. Data communicating component 516 can communicate the data to RLC layer processing component 508. MAC layer processing component 506 can continue this process until PDU identifying component 512 determines that a received MAC PDU has a different channel identifier (e.g., corresponds to a different logical channel). In another example, data communicating component 516 can buffer and/or order MAC SDUs until the PDU identifying component 512 receives a PDU with a different channel identifier, and can then communicate the MAC SDUs to the RLC layer processing component 508.

In addition, PDU identifying component 512 can determine other information regarding the PDUs, such as whether the PDU corresponds to a last PMCH of an MSP. As described above, there can be multiple instances of each PMCH within an MSP (e.g., in multiple allocation periods). Thus, for example, where PDU identifying component 512 does not identify LCIDs of one or more requested MTCHs in a given PMCH instance, MAC PDU decoding component 510 can continue decoding PDUs until PDU identifying component 512 determines that a PDU corresponds to a last PMCH within an MSP. In this example, MAC PDU decoding component 510 may decode a PDU of a the requested MTCH in a subsequent PMCH instance in the given MSP, and can thus attempt to identify such LCIDs until a subframe corresponding to a last PMCH in the MSP is reached. If a corresponding LCID is found during decoding, as described, data communicating component 516 can provide the MTCH data to a communication layer (e.g., an upper layer, such as RLC). If the LCID is not found for a given PMCH, data communicating component 516 can provide an error or other failure message to the RLC layer processing component 508 for a given MTCH in the PMCH. Once the last PMCH in the MSP is reached, scheduling information obtaining component 504 can attempt to obtain the MSI MAC control element in a next MSP, in which case MAC layer processing component 506 can decode MTCH data based on the MSI MAC control element, as described.

In another example, where scheduling information obtaining component 504 detects that the MSI MAC control element is not properly received, scheduling information obtaining component 504 can utilize a previous MSI MAC control element to specify scheduling information for one or more MTCHs to MAC layer processing component 506. In this example, MAC layer processing component 506 can attempt to locate MAC PDUs related to a given MTCH based on information in the previous MSI MAC control element related to a stop frame and/or subframe of the MTCH. To verify, for example, PDU identifying component 512 can obtain a LCID from a MAC subheader of a MAC PDU located based on the previous MSI MAC control element, and can compare the LCID to a received LCID associated with the MTCH. Where the LCIDs match, data identifying component 514 can determine data in the MAC SDU, and data communicating component 516 can provide the data to RLC layer processing component 508, as described. In addition, MAC PDU decoding component 510 can again continue to decode PDUs until PDU identifying component 512 determines a PDU includes a different LCID.

Moreover, in this example, scheduling can vary for different MSPs. Thus, for example, in the MSP during which scheduling information obtaining component 504 fails to properly obtain the MSI MAC control element, scheduling information obtaining component 504 can provide a previous MSI MAC control element or related information to MAC layer processing component 506. In this example, MAC PDU decoding component 510 can determine a time period of a starting subframe of the previous MSI MAC control element, T, and can apply a time advance, A, to the time period of the starting subframe (T-A, in one example) to start decoding subframes. For example, MAC PDU decoding component 510 can determine A based on at least one of a known subframe information related to PMCHs and/or a corresponding MBSFN configuration, a received parameter value for A, a history of determined MSP timings such to determine the PMCH timing difference between the previous MSP of the previously received MSI and a current MSP, and/or the like.

In yet another example, MTCH scheduling within a PMCH can be ordered according to LCID. Thus, for example, PDU identifying component 512 can determine an LCID from a MAC subheader of a MAC PDU. Where the LCID is less than an LCID of a requested MTCH, MAC PDU decoding component 510 can continue decoding MAC PDUs until the last subframe of the PMCH is encountered or until the MAC PDU related to the LCID is processed. Where the LCID is greater than a requested MTCH, MAC PDU decoding component 510 can refrain from decoding MAC PDUs until a next PMCH, MSP, etc. Where the LCID is that of a requested MTCH, MAC PDU decoding component 510 can continue to decode MAC PDUs until PDU identifying component 512 determines a different LCID in a MAC PDU and/or that the subframe is that of a last PMCH in the MSP.

In addition, in this example, data identifying component 514 can utilize framing information to determine the data in the MAC SDU. For example, the framing information in the MAC SDU can indicate whether the data includes the first byte of an RLC SDU (e.g., where framing information indicates 00 or 01). In this example, data communicating component 516 can obtain the requested data of the requested MTCH. Where framing information in the MAC SDU indicates that first byte is not included in the data (e.g., framing information indicates 10 or 11), then partial data can be recovered and communicated by data communicating component to RLC layer processing component 508. Where the missing data is requested, for example, MAC PDU decoding component 510 can attempt to decode the MTCH in a subsequent instance of the PMCH in another allocation period of the given MSP if present. Thus, in the examples described above, MTCH data can be obtained when the MSI MAC control element is not properly determined.

Figure 6:
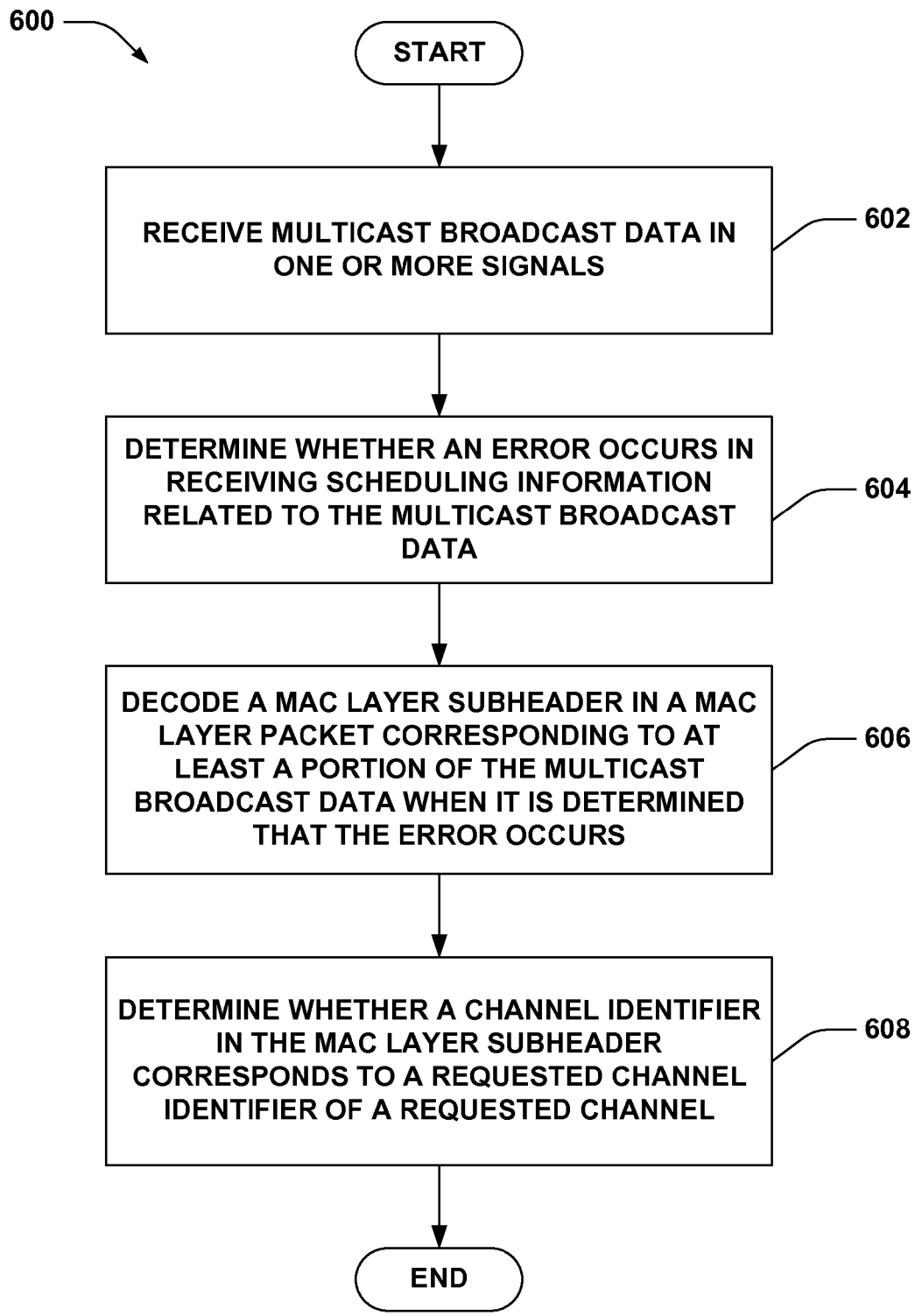
FIG. 6 is a flow chart of an aspect of a methodology for determining whether to decode multicast broadcast data where an error occurs in receiving a multicast channel scheduling information (MSI) media access control (MAC) control element.
Figure 7:
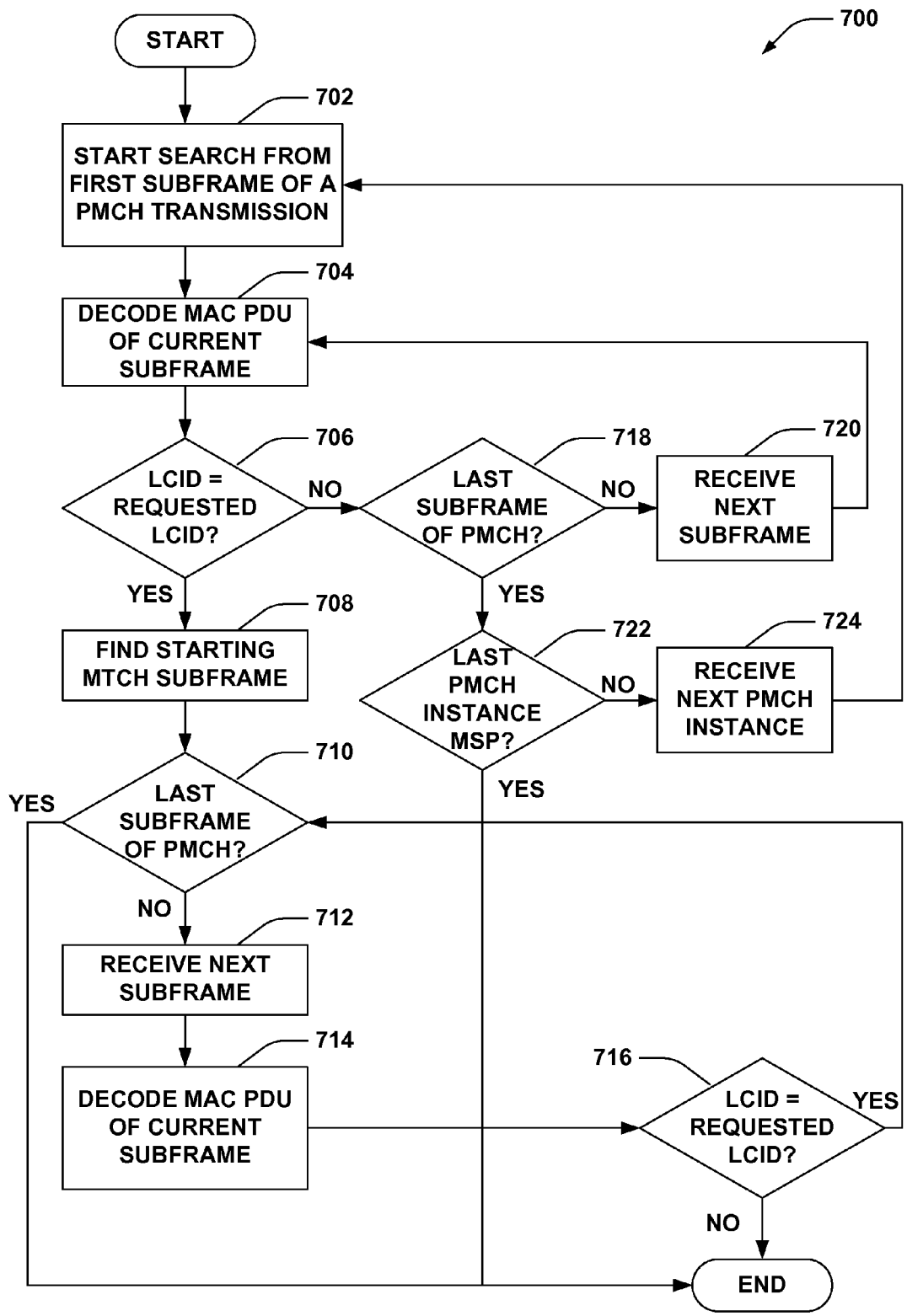
FIG. 7 is a flow chart of an aspect of a methodology for decoding multicast broadcast data.
Figure 8:
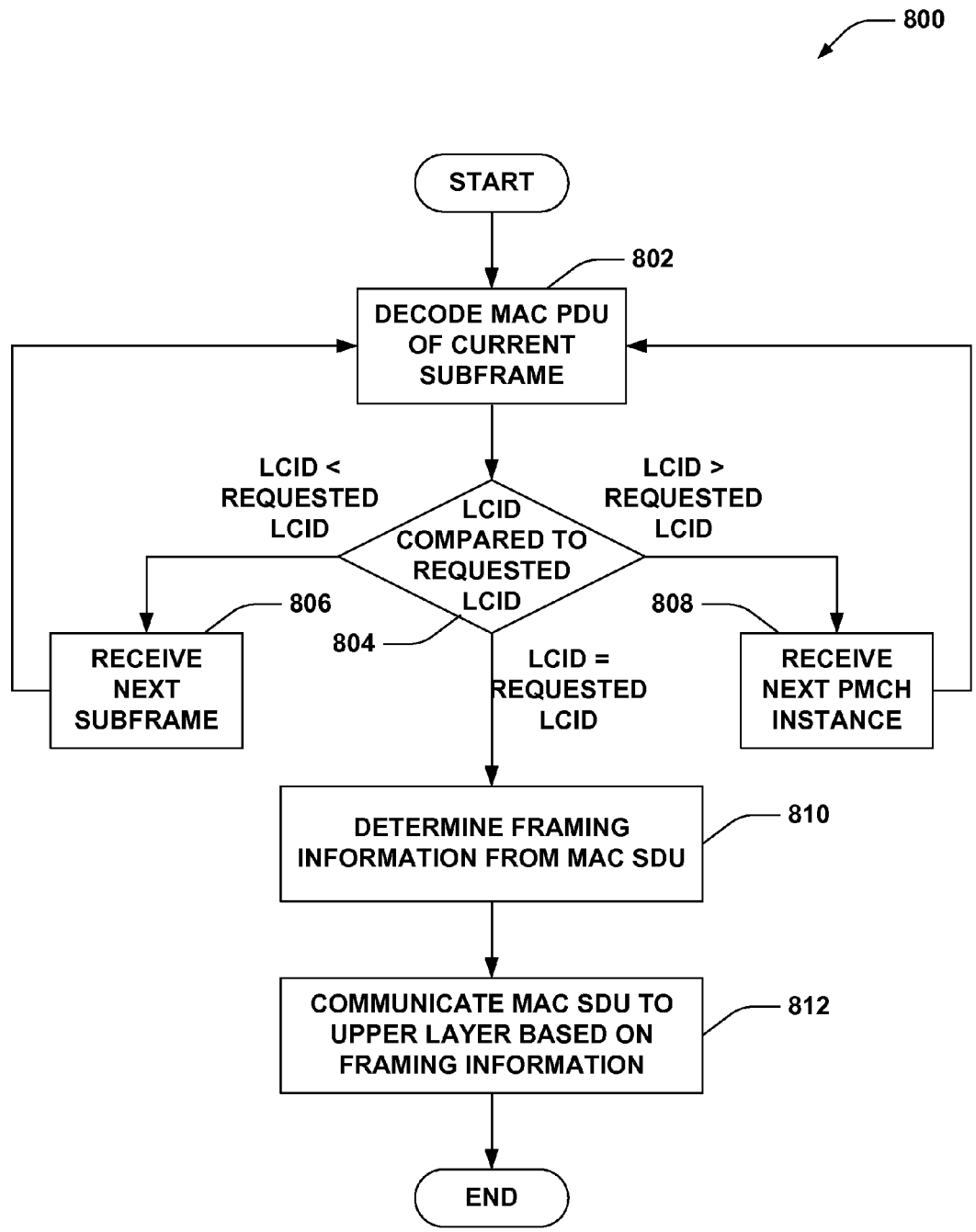
FIG. 8 is a flow chart of an aspect of a methodology for decoding multicast broadcast data based on comparing a logical channel identifier.

FIGS. 6-8 illustrate example methodologies relating to decoding multicast broadcast communications. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 6 depicts an example methodology 600 for decoding multicast broadcast communications. At 602, multicast broadcast data can be received in one or more signals. For example, this can include receiving data in an indicated MBSFN subframe (e.g., eMBMS data) from one or more broadcasting entities.

At 604, it can be determined whether an error occurs in receiving scheduling information related to the multicast broadcast data. For example, the scheduling information can include a MSI MAC control element. In addition, the determination can include determining that a subframe over which the MSI MAC control element is expected is not received, that a signal quality of a signal received in the subframe is below a threshold, an error in the decoding process (e.g., failed CRC), and/or the like.

At 606, a MAC layer subheader in a MAC layer packet corresponding to at least a portion of the multicast broadcast data can be decoded when it is determined that the error occurs. As described, a MBSFNAreaConfiguration can be received in a configuration message that specifies subframes over which multicast broadcast data (e.g., eMBMS data) is received; in addition, subframes related to certain PMCH instances can be determined from the MBSFNAreaConfiguration. Moreover, the MAC layer subheader can include various fields, including a channel identifier related to a MAC SDU in the MAC layer packet. The channel identifier can correspond to a given logical channel, as described, and this information can thus be used to obtain logical channel data in the absence of scheduling information. In one example, the MAC layer packet can be a first received packet in a subframe and/or related to a certain PMCH. In another example, the MAC layer packet can be selected based on a previously received MSI. In this example, a timing advance can be applied to a time period of receiving the previously received MSI to ensure proper timing of receiving related MTCHs.

At 608, it can be determined whether a channel identifier in the MAC layer subheader corresponds to a requested channel identifier of a requested channel. For example, certain broadcast data logical channels, such as MTCHs, can be subscribed to or otherwise determined to be requested (e.g., based on an indication from a user or an application executing on a device). One or more channel identifiers, e.g., LCIDs, related to the logical channels, e.g., MTCH(s), can be received from the broadcasting entity or other component that communicates the MTCH(s) and/or related channel identification information. Based on the determination, for example, a MAC SDU in the MAC layer packet can be provided to a communication layer, as described. For example, where an LCID does correspond to the requested LCID, the data in the MAC SDU, which corresponds to the requested MTCH, can be provided to a communication layer, such as an RLC layer. In either case, a next MAC layer packet can be received, and where the LCID still corresponds to the requested LCID, the MAC SDU in the packet can be provided to the communication layer. In this regard, if the MSI MAC control element is missed in a first PMCH instance, the MTCH data, whether from the first PMCH instance or a subsequent PMCH instance in an MSP, can still be processed.

FIG. 7 depicts an example methodology 700 for decoding multicast broadcast communications where an MSI MAC control element is not properly received. At 702, a search can be started from a first subframe of a first PMCH transmission. For example, based on information known about the PMCH, a subframe during which the PMCH transmission begins can be determined. At 704, a MAC PDU of a current subframe can be decoded. This can include receiving a signal over the subframe, decoding the signal to obtain one or more MAC PDUs, and determining at least a portion of information from at least one subheader. At 706, it can be determined whether an LCID in the MAC subheader is equal to a requested LCID. If so, a starting MTCH subframe can be found at 708. At 710, it can be determined whether the subframe is the last subframe of the PMCH. If not, a next subframe can be received at 712, and a MAC PDU of the current subframe can be decoded at 714. At 716, it can be determined whether the LCID of the current subframe equals the requested LCID. If so, the method can continue at 710 where it can be determined whether the current subframe is the last subframe of the PMCH at 710.

If the LCID is not equal to the requested LCID at 716, the method can end with the MTCH subframe located. If the current subframe is the last subframe of the PMCH, at 710, the method can end with the MTCH subframe located. If the LCID does not equal the requested LCID at 706, it can be determined whether the subframe is the last subframe of the PMCH at 718. If not, the next subframe can be received at 720, and the method can continue to step 704 where the MAC PDU of the current subframe can be decoded. If the current subframe is the last subframe of the PMCH at 718, it can be determined at 722 whether the PMCH is the last PMCH instance in the MSP. If not, a next PMCH instance can be received at 724. This can be based on information known regarding the MBSFN subframe configuration, and the method can continue at 702, where the search can be started from a first subframe of the PMCH. If the PMCH is the last PMCH instance of the MSP at 722, the method can end with a failure to find the MTCH subframe.

FIG. 8 shows an example methodology 800 for decoding multicast broadcast communications based on comparing an LCID to a requested LCID. At 802, a MAC PDU of the current subframe can be decoded. At 804, an LCID in the MAC PDU can be compared to a requested LCID. Where the LCID is less than the requested LCID, a next subframe can be received at 806, and the method can continue to step 802 where the MAC PDU of the current subframe is decoded. Where the LCID is greater than the requested LCID at 804, a next PMCH instance can be received at 808, and the method can continue at 802 where the MAC PDU of the current subframe is decoded. Where the LCID is equal to the requested LCID at 804, framing information from the MAC SDU can be determined at 810. Thus, for example, where a portion of the related MAC SDU is present in the MAC PDU, this can be conveyed to an upper layer. At 812, the MAC SDU can be communicated to the upper layer based on framing information.

It will be appreciated that, in accordance with one or more aspects described herein, inferences can be made regarding determining a subframe of a requested MTCH or related PMCH, processing a related MAC SDU or portion thereof, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
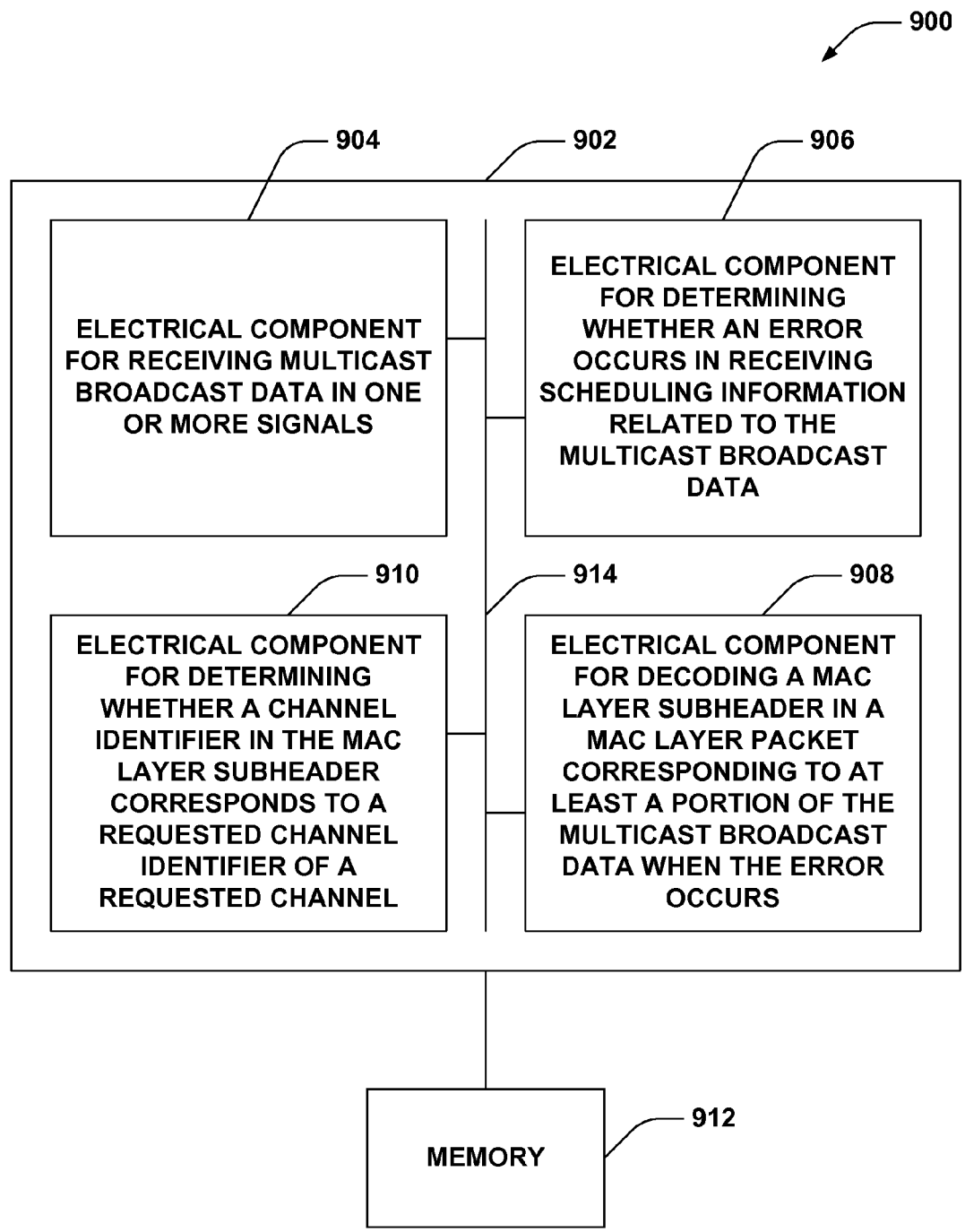
FIG. 9 is a block diagram of an example system that decodes multicast broadcast data where a multicast channel scheduling information (MSI) media access control (MAC) control element is not received.

FIG. 9 illustrates a system 900 for decoding multicast broadcast communications. For example, system 900 can reside at least partially within a device or other receiver. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving multicast broadcast data in one or more signals. For example, the one or more signals can be received over an MBSFN subframe. Logical grouping 902 can also include an electrical component for determining whether an error occurs in receiving scheduling information related to multicast broadcast data 906. This can include determining at least one of a signal carrying an MSI MAC control element is not received in a corresponding subframe, a related signal is received at a low signal quality (e.g., below a threshold level), a related signal fails a CRC or similar verification, and/or the like.

Logical grouping 902 can also include an electrical component for decoding a MAC layer subheader in a MAC layer packet corresponding to at least a portion of the multicast broadcast data when the error occurs 908. Further, logical grouping 902 can include an electrical component for determining whether a channel identifier in the MAC layer subheader corresponds to a requested channel identifier of a requested channel 910. In one example, the channel identifier can be an LCID for a requested MTCH. For example, electrical component 904 can include a receiving component 502, and electrical component 906 can include a scheduling information obtaining component 504, as described above. In addition, for example, electrical component 908, in an aspect, can include a MAC PDU decoding component 510, as described above. Electrical component 910, in one example, can include a PDU identifying component 512.

Additionally, system 900 can include a memory 912 that retains instructions for executing functions associated with the electrical components 904, 906, 908, and 910. While shown as being external to memory 912, it is to be understood that one or more of the electrical components 904, 906, 908, and 910 can exist within memory 912. Electrical components 904, 906, 908, and 910, in an example, can be interconnected over a bus 914 or similar connection to allow communication among the components. In one example, electrical components 904, 906, 908, and 910 can include at least one processor, or each electrical component 904, 906, 908, and 910 can be a corresponding module of at least one processor. Moreover, in an additional or alternative example, electrical components 904, 906, 908, and 910 can be a computer program product comprising a computer readable medium, where each electrical component 904, 906, 908, and 910 can be corresponding code.

Figure 10:
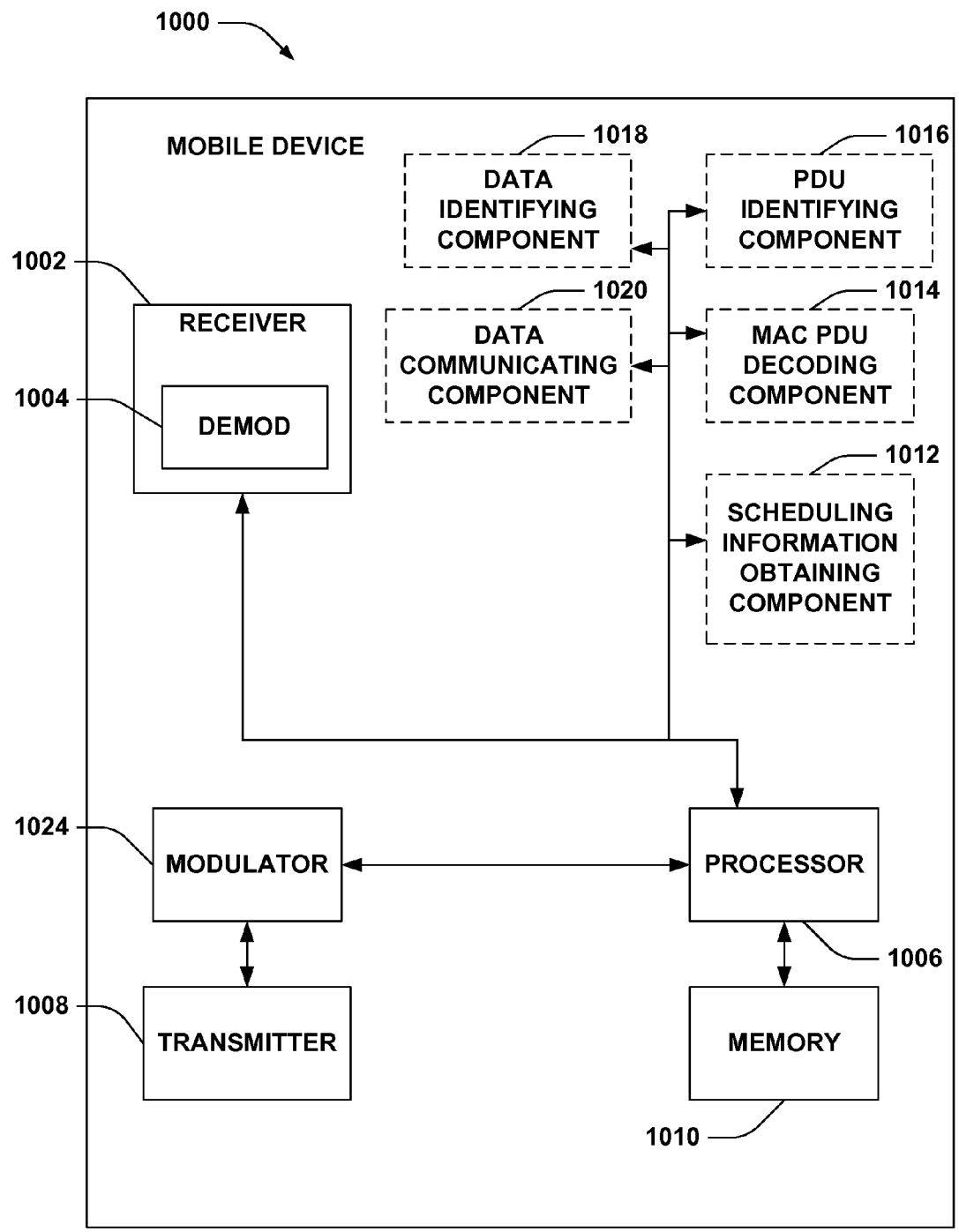
FIG. 10 is a block diagram of an aspect of an example mobile device in accordance with aspects described herein.

FIG. 10 is an illustration of a mobile device 1000 that facilitates decoding multicast broadcast communications. Mobile device 1000 may include a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 can include a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000.

Mobile device 1000 can additionally include memory 1010 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1010 can additionally store protocols and/or algorithms associated with estimating and/or utilizing a channel (e.g., performance based, capacity based, etc.).

It will be appreciated that the data store (e.g., memory 1010) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to include, without being limited to, these and any other suitable types of memory.

In one example, receiver 1002 can be similar to a receiving component 402. Processor 1006 can further be optionally operatively coupled to a scheduling information obtaining component 1012, which can be similar to scheduling information obtaining component 504. Processor 1006 can also be optionally operatively coupled to one or more components of a MAC processing layer, such as a MAC PDU decoding component 1014, which can be similar to MAC PDU decoding component 510, a PDU identifying component 1016, which can be similar to PDU identifying component 512, a data identifying component 1018, which can be similar to data identifying component 514, and/or a data communicating component 1020, which can be similar to data communicating component 516.

Mobile device 1000 still further includes a modulator 1024 that modulates signals for transmission by transmitter 1008 to, for instance, a base station, another mobile device, etc. Moreover, for example, mobile device 1000 can include multiple transmitters 1008 for multiple network interfaces, as described. Although depicted as being separate from the processor 1006, it is to be appreciated that the scheduling information obtaining component 1012, MAC PDU decoding component 1014, PDU identifying component 1016, data identifying component 1018, data communicating component 1020, demodulator 1004, and/or modulator 1024 can be part of the processor 1006 or multiple processors (not shown)), and/or stored as instructions in memory 1010 for execution by processor 1006.

Figure 11:
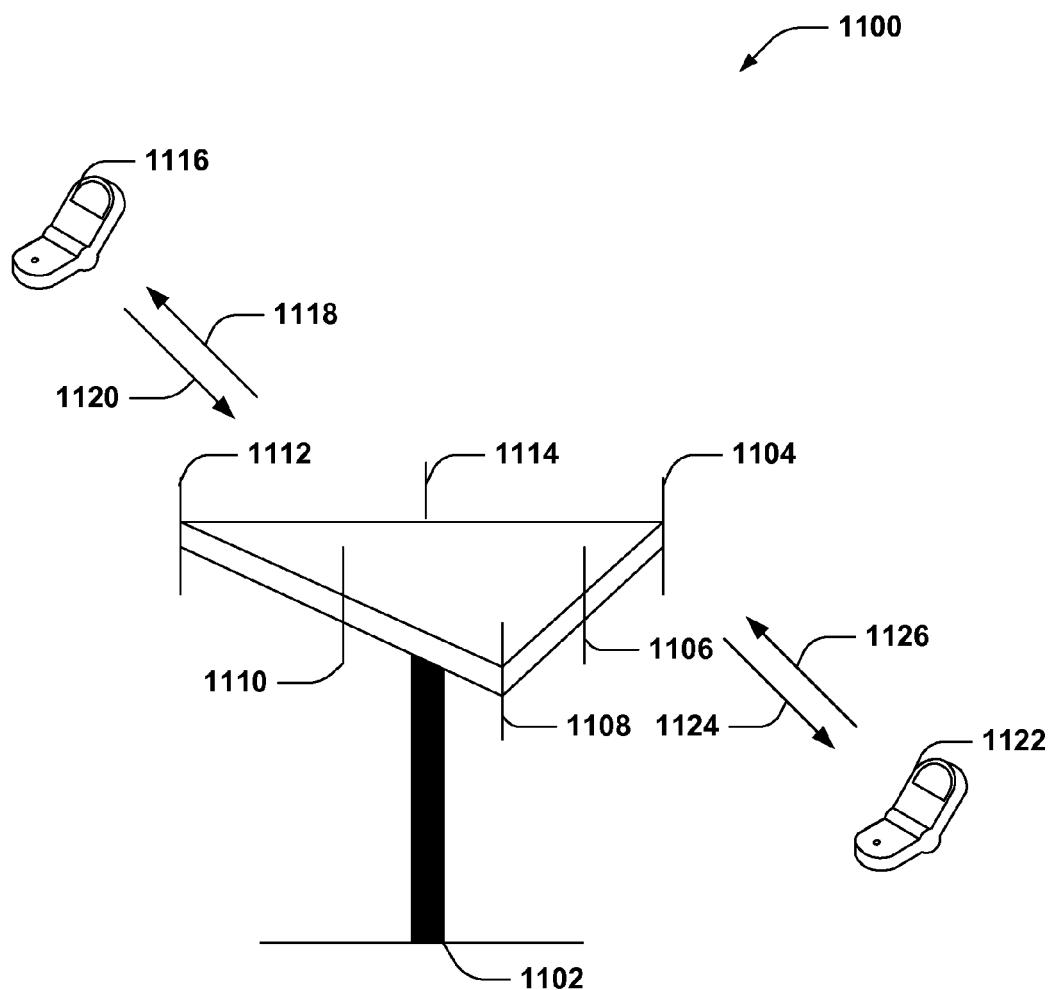
FIG. 11 is a block diagram of an aspect of a wireless communication system in accordance with various aspects set forth herein.

FIG. 11 illustrates a wireless communication system 1100 in accordance with various embodiments presented herein. System 1100 includes a base station 1102 that can include multiple antenna groups. For example, one antenna group can include antennas 1104 and 1106, another group can include antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn include a plurality of components or modules associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system or similar system that allows assigning multiple carriers between base station 1102 and mobile devices 1116 and/or 1122. For example, base station 1102 can communicate multicast broadcast data to devices 1116 and/or 1122, which can decode the data as described herein where MSI is not properly received.

Figure 12:
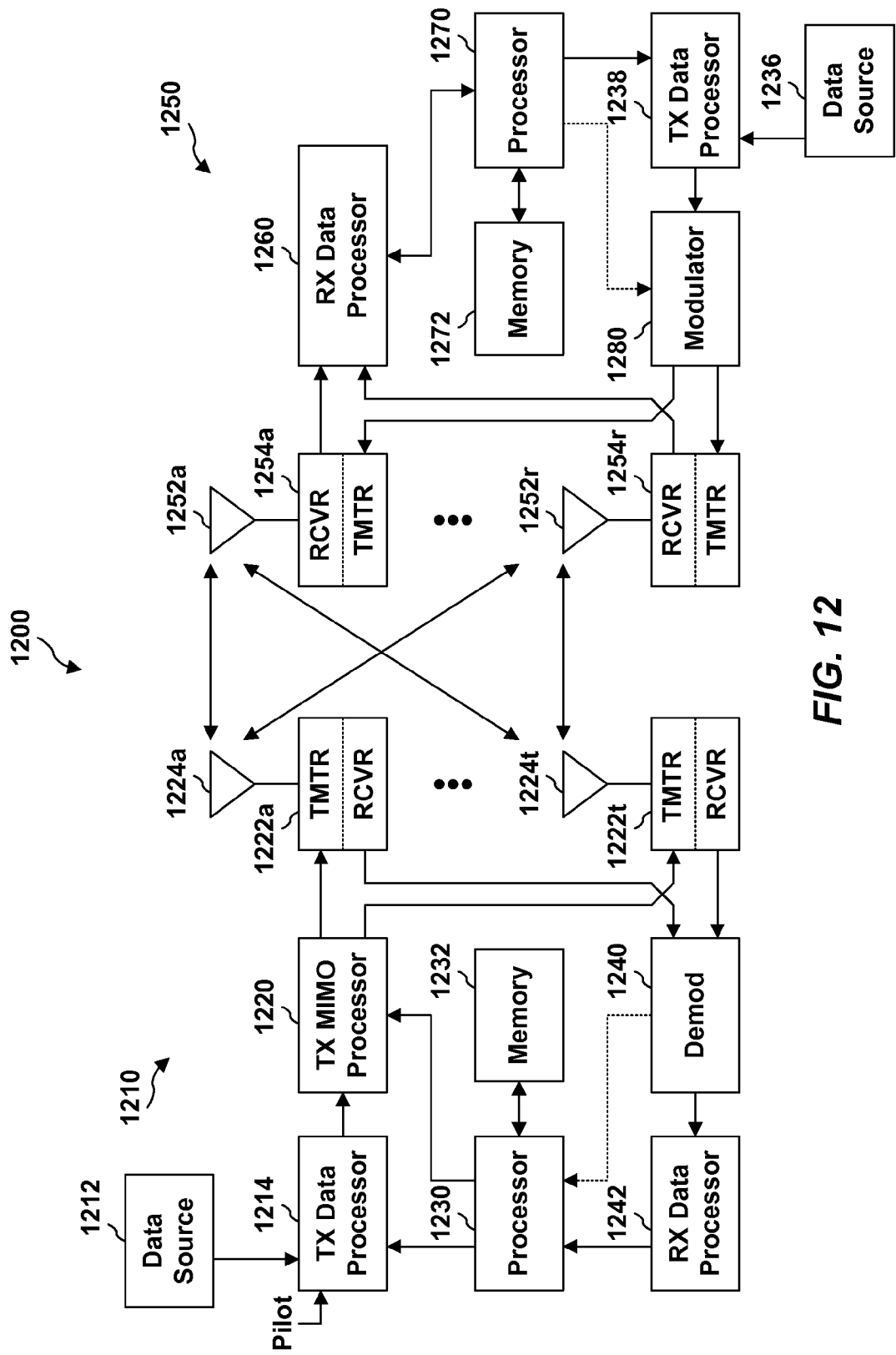
FIG. 12 is a schematic block diagram of an aspect of a wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the frame configurations (FIG. 1), communication timelines (FIG. 2), PDUs (FIG. 3), systems (FIGS. 4, 5, 10, and 11), methods (FIGS. 6-8), and/or mobile devices (FIG. 9) described herein to facilitate wireless communication there between. For example, components or functions of the systems and/or methods described herein can be part of a memory 1232 and/or 1272 or processors 1230 and/or 1270 described below, and/or can be executed by processors 1230 and/or 1270 to perform the disclosed functions.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

The reverse link message can include various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Moreover, processors 1230 and 1270 can assist in decoding multicast broadcast data, as described herein. For example, processors 1230 and 1270 can execute functions described with respect to such decoding and/or memory 1232 and 1272 can store such functions and/ or data related thereto.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for receiving multicast broadcast data in a wireless network, comprising:
   receiving multicast broadcast data in one or more signals;
   determining whether an error occurs in receiving scheduling information related to the multicast broadcast data;
   decoding a media access control (MAC) layer subheader in a MAC layer packet corresponding to at least a portion of the multicast broadcast data when it is determined that the error occurs; and
   determining whether a channel identifier in the MAC layer subheader corresponds to a requested channel identifier of a requested channel.

2. The method of claim 1, further comprising providing a MAC service data unit (SDU) in the MAC layer packet to a communication layer, wherein the determining whether the channel identifier corresponds to the requested channel identifier comprises determining that the channel identifier corresponds to the requested channel identifier.

3. The method of claim 2, further comprising:
   decoding a subsequent MAC layer subheader in a subsequent MAC layer packet;
   determining that a subsequent channel identifier in the subsequent MAC layer subheader corresponds to the requested channel identifier; and
   providing a subsequent MAC SDU in the subsequent MAC layer packet to the communication layer based in part on the determining that the subsequent channel identifier corresponds to the requested channel identifier.

4. The method of claim 2, further comprising determining framing information related to the MAC SDU, wherein the providing the MAC SDU is further based on the framing information.

5. The method of claim 1, further comprising:
   determining that a physical channel related to the MAC layer packet is a last physical channel in a scheduling period; and
   attempting to receive a subsequent scheduling information in a subsequent scheduling period based on the determining that the physical channel is the last physical channel in the scheduling period.

6. The method of claim 1, further comprising selecting the MAC layer packet for decoding based in part on determining the MAC layer packet is in a subframe corresponding to a physical channel based in part on a previous scheduling information.

7. The method of claim 6, further comprising determining the subframe based in part on applying a timing advance to a time period during which the previous scheduling information is received.

8. The method of claim 1, further comprising decoding a subsequent MAC layer subheader in a subsequent MAC layer packet, wherein the determining whether the channel identifier corresponds to the requested channel identifier comprises determining that the channel identifier is less than the requested channel identifier.

9. The method of claim 1, further comprising decoding a subsequent MAC layer subheader in a subsequent MAC layer packet corresponding to a next physical channel instance, wherein the determining whether the channel identifier corresponds to the requested channel identifier comprises determining that the channel identifier is greater than the requested channel identifier.

10. The method of claim 1, wherein the multicast broadcast data corresponds to evolved multicast broadcast multimedia service data, the scheduling information is determined from a multicast scheduling information MAC control element, the requested channel corresponds to a multicast traffic channel, and the requested channel identifier corresponds to a logical channel identifier.

11. An apparatus for receiving multicast broadcast data in a wireless network, comprising:
   means for receiving multicast broadcast data in one or more signals;
   means for determining whether an error occurs in receiving scheduling information related to the multicast broadcast data;
   means for decoding a media access control (MAC) layer subheader in a MAC layer packet corresponding to at least a portion of the multicast broadcast data when it is determined that the error occurs; and
   means for determining whether a channel identifier in the MAC layer subheader corresponds to a requested channel identifier of a requested channel.

12. The apparatus of claim 11, further comprising means for providing a MAC service data unit (SDU) in the MAC layer packet to a communication layer, wherein the means for determining whether the channel identifier corresponds to the requested channel identifier determines that the channel identifier corresponds to the requested channel identifier.

13. The apparatus of claim 11, further comprising means for determining that a physical channel related to the MAC layer packet is a last physical channel in a scheduling period, and the means for detecting attempts to receive a subsequent scheduling information in a subsequent scheduling period based on the physical channel being the last physical channel in the scheduling period.

14. An apparatus for wireless communication, comprising:
at least one processor configured to:
  receive multicast broadcast data in one or more signals;
  determine whether an error occurs in receiving scheduling information related to the multicast broadcast data;
  decode a media access control (MAC) layer subheader in a MAC layer packet corresponding to at least a portion of the multicast broadcast data when it is determined that the error occurs; and
  determine whether a channel identifier in the MAC layer subheader corresponds to a requested channel identifier of a requested channel; and
a memory coupled to the at least one processor.

15. The apparatus of claim 14, wherein the at least one processor is further configured to provide a MAC service data unit (SDU) in the MAC layer packet to a communication layer, and wherein the at least one processor determines that the channel identifier corresponds to the requested channel identifier.

16. The apparatus of claim 14, wherein the at least one processor is further configured to:
  determine that a physical channel related to the MAC layer packet is a last physical channel in a scheduling period; and
  attempt to receive a subsequent scheduling information in a subsequent scheduling period based on the determining that the physical channel is the last physical channel in the scheduling period.

17. A non-transitory
computer-readable medium, comprising:
  code for causing at least one computer to receive multicast broadcast data in one or more signals;
  code for causing the at least one computer to determine whether an error occurs in receiving scheduling information related to the multicast broadcast data;
  code for causing the at least one computer to decode a media access control (MAC) layer subheader in a MAC layer packet corresponding to at least a portion of the multicast broadcast data when it is determined that the error occurs; and
  code for causing the at least one computer to determine whether a channel identifier in the MAC layer subheader corresponds to a requested channel identifier of a requested channel.

18. The computer-readable medium of claim 17, further comprising code for causing the at least one computer to provide a MAC service data unit (SDU) in the MAC layer packet to a communication layer, and wherein the code for causing the at least one computer to determine whether the channel identifier corresponds to the requested channel identifier determines that the channel identifier corresponds to the requested channel identifier.

19. The computer-readable medium of claim 17, further comprising:
  code for causing the at least one computer to determine that a physical channel related to the MAC layer packet is a last physical channel in a scheduling period; and
  code for causing the at least one computer to attempt to receive a subsequent scheduling information in a subsequent scheduling period based on the determining that the physical channel is the last physical channel in the scheduling period.

20. An apparatus for receiving multicast broadcast data in a wireless network, comprising:
  a receiving component for receiving multicast broadcast data in one or more signals;
  a scheduling information obtaining component for determining whether an error occurs in receiving scheduling information related to the multicast broadcast data;
  a media access control (MAC) protocol data unit (PDU) decoding component for decoding a MAC layer subheader in a MAC layer packet corresponding to at least a portion of the multicast broadcast data when it is determined that the error occurs; and
  a PDU identifying component for determining whether a channel identifier in the MAC layer subheader corresponds to a requested channel identifier of a requested channel.

21. The apparatus of claim 20, further comprising a data communicating component for providing a MAC service data unit (SDU) in the MAC layer packet to a communication layer, wherein the PDU identifying component determines that the channel identifier corresponds to the requested channel identifier.

22. The apparatus of claim 21, wherein the MAC PDU decoding component decodes a subsequent MAC layer subheader in a subsequent MAC layer packet, the PDU identifying component determines that a subsequent channel identifier in the subsequent MAC layer subheader corresponds to the requested channel identifier, and the data communicating component provides a subsequent MAC SDU in the subsequent MAC layer packet to the communication layer based in part on the PDU identifying component determining that the subsequent channel identifier corresponds to the requested channel identifier.

23. The apparatus of claim 21, further comprising a data identifying component for determining framing information related to the MAC SDU, wherein the data communicating component provides the MAC SDU further based on the framing information.

24. The apparatus of claim 20, further comprising a data identifying component for determining that a physical channel related to the MAC layer packet is a last physical channel in a scheduling period, wherein the scheduling information obtaining component attempts to receive a subsequent scheduling information in a subsequent scheduling period based on the data identifying component determining that the physical channel is the last physical channel in the scheduling period.

25. The apparatus of claim 20, wherein the MAC PDU decoding component selects the MAC layer packet for decoding based in part on determining the MAC layer packet is in a subframe corresponding to a physical channel based in part on a previous scheduling information.

26. The apparatus of claim 25, wherein the MAC PDU decoding component determines the subframe based in part on applying a timing advance to a time period during which the previous scheduling information is received.

27. The apparatus of claim 20, wherein the MAC PDU decoding component decodes a subsequent MAC layer subheader in a subsequent MAC layer packet, and wherein the PDU identifying component determines that the channel identifier is less than the requested channel identifier.

28. The apparatus of claim 20, wherein the MAC PDU decoding component decodes a subsequent MAC layer subheader in a subsequent MAC layer packet corresponding to a next physical channel instance, and wherein the PDU identifying component determines that the channel identifier is greater than the requested channel identifier.

29. The apparatus of claim 20, wherein the multicast broadcast data corresponds to evolved multicast broadcast multimedia service data, the scheduling information is determined from a multicast scheduling information MAC control element, the requested logical channel corresponds to a multicast traffic channel, and the requested channel identifier corresponds to a logical channel identifier.

* * * * *

UNITED STATES PATENT AND TRADEMARK OFFICE
CERTIFICATE OF CORRECTION

PATENT NO. : 9,130,726 B2  
APPLICATION NO. : 13/289594  
DATED : September 8, 2015  
INVENTOR(S) : Zhengwei Liu Page 1 of 1

It is certified that error appears in the above-identified patent and that said Letters Patent is hereby corrected as shown below:

ON THE TITLE PAGE

Assignee reads:

(73) Assignee: QUALCOMM INCORPORATED, San Diego, CA (US)

Assignee should read:

(73) Assignee: QUALCOMM Incorporated, San Diego, CA (US)

Signed and Sealed this  
Fifteenth Day of March, 2016

Michelle K. Lee  
*Director of the United States Patent and Trademark Office*